United States Patent [19]

Way

[11] Patent Number: 4,891,694
[45] Date of Patent: Jan. 2, 1990

[54] FIBER OPTIC CABLE TELEVISION DISTRIBUTION SYSTEM

[75] Inventor: Winston I. Way, Tinton Falls, N.J.

[73] Assignee: Bell Communications Research, Inc., Livingston, N.J.

[21] Appl. No.: 274,303

[22] Filed: Nov. 21, 1988

[51] Int. Cl.$^4$ .......................... H04N 7/10; H04B 9/00
[52] U.S. Cl. ......................................... 358/86; 370/3; 455/5; 455/610
[58] Field of Search .................. 358/86; 370/3; 455/4, 455/5, 610

[56] References Cited

U.S. PATENT DOCUMENTS

| | | | |
|---|---|---|---|
| 4,441,180 | 4/1984 | Schüssler | 370/3 |
| 4,450,481 | 5/1984 | Dickinson | 358/86 X |
| 4,484,218 | 11/1984 | Boland et al. | 358/86 |
| 4,491,983 | 1/1985 | Pinnow et al. | 358/86 X |
| 4,530,008 | 7/1985 | McVoy | 358/86 X |
| 4,760,442 | 7/1988 | O'Connell et al. | 358/86 |
| 4,787,085 | 11/1988 | Suto et al. | |

OTHER PUBLICATIONS

Szentesi et al, "A Fiber Optic Trunk for Analog Video Transmission," Intelcon 79 Exposition Proceedings, Dallas, TX, U.S.A., 2/26/79 to 3/2/79, pp. 142–145.
A. C. Deichmiller, "Progress in Fiber Optics Transmission Systems for Cable Television," *IEEE Transactions on Cable Television*, vol. CATV-5, No. 2, Apr. 1980, pp. 50–59.
Elmer H. Hara, "Conceptual Design of a Switched Television-Distribution System Using Optical-Fiber Waveguides," *IEEE Transactions on Cable Television*, vol. CATV-2, No. 3, Jul. 1977.
"A 1.3 μm 35-km Fiber-Optic Microwave Multicarrier Transmission System for Satellite Earth Stations," W. I. Way et al., Journal of Lightwave Technology, vol. LT-5, No. 9, pp. 1325–1332, Sep. 1987.
"Fiber Backbone: A Proposal for an Evolutionary CATV Network Architecture," J. A. Chiddix et al., Technical Proceedings, National Cable Television Association Conference, pp. 73–82, 1988.
"SNR Fluctuation and Nonlinear Distortion in PFM Optical NTSC Video Transmission Systems," Tetsuya Kanada et al., IEEE Transactions on Communications, vol. COM-30, No. 8, pp. 1868–1875, Aug. 1982.
"Applications of Video on Fiber Cable", C. Lundgren et al., IEEE Communications Magazine, vol. 24, No. 5, pp. 33–49, May 1986.
"Implementation of a Broadband Integrated Services Hybrid Network", M. Farooque Mesiya, IEEE Communications Magazine, vol. 26, No. 1, pp. 34–43, Jan. 1988.
"Low-Noise Wideband Analog Optical Link Using a DFB Laser Diode", K. Fujito et al., Optical Fiber Communications Conference, Technical Digest, Paper TH01, 1988.

Primary Examiner—Keith E. George
Attorney, Agent, or Firm—James W. Falk

[57] ABSTRACT

In a system for distributing CATV signals to multiple customer locations, each location is connected to a remote terminal via a dedicated optical fiber. The tuner associated with each customer TV set is located in the remote terminal. Channel-selection signals are sent over the fiber from the customer location to the remote terminal. Only the single selected channel is then transmitted over the fiber from the remote terminal to the associated TV set.

2 Claims, 3 Drawing Sheets

FIBER OPTIC CABLE TELEVISION DISTRIBUTION SYSTEM

BACKGROUND OF THE INVENTION

This invention relates to cable television (CATV) and, more particularly, to an economical wide-bandwidth system for distributing CATV signals to multiple customers.

Proposals have been made to utilize an optical fiber as the transmission medium for carrying multiple-channel CATV signals from a source to a distant remote terminal (RT) from which the signals are in turn distributed to multiple customers. Such a wide-bandwidth medium, commonly referred to as a supertrunk, typically requires a relatively expensive laser at the source and a relatively expensive optical detector at the RT. But since the RT is designed to distribute the CATV signals in parallel to many customers, the shared cost per customer of these expensive components is in practice acceptably low.

Heretofore, the multiple-channel CATV signals delivered to the RT have in effect simply been retransmitted to each of the customers by the RT. In other words, the transmission medium between the RT and each customer carries the total set of channels provided by the CATV signal source. In turn, each customer is provided at his premises with a TV tuner with which he locally selects for viewing one of the multiple channels transmitted to him from the RT.

Conventional CATV distribution systems typically utilize coaxial cable to transmit the multiple-channel signals from the RT to customers. Although some proposals have been made to employ a dedicated wide-bandwidth optical fiber between the RT and each customer, these proposals have not generally been regarded as economically feasible. This is so because the cost of the laser and detector that would be required per RT-to-customer fiber to achieve satisfactory signal performance in such a distribution system is in practice extremely high. If lower-quality lower-cost lasers were used to transmit the multiple-channel CATV signals from the RT, the signals received by customers would generally be of unacceptable quality, due to inherent laser noise, intermodulation noise among the channels and a low modulation index per channel.

Accordingly, considerable efforts have been directed by workers skilled in the art aimed at trying to design an economically feasible CATV distribution system that includes an optical fiber path between an RT and each customer served thereby. It was recognized that these efforts, if successful, could provide a practical high-quality system capable of economically distributing CATV, and other, signals to multiple customers.

SUMMARY OF THE INVENTION

In accordance with the principles of the present invention, all the TV tuners of a multiple-channel CATV signal distribution system are located in the RT rather than at the premises of customers. Only one channel at a time is transmitted from the RT via an optical fiber to a customer's TV set. (If a customer has several TV sets each equipped for CATV reception, the fiber to that customer will carry at the most several channels at a time.)

In accordance with this invention, relatively narrow-bandwidth CATV signals representative of one channel (or at the most several channels) are transmitted at a time over a relatively short RT-to-customer fiber path. As a result, relatively inexpensive optical transmitters and detectors can be used to provide good-quality signals over each such path.

Thus, in accordance with the present invention, an economical CATV distribution system is provided that includes a dedicated optical fiber between an RT and each of multiple customers. In turn, the availability of such an RT-to-customer path provides an attractive medium for transmitting a variety of analog and/or digital signals over the CATV distribution system.

BRIEF DESCRIPTION OF THE DRAWING

A complete understanding of the present invention and of the above and other features and advantages thereof may be gained from a consideration of the following detailed description presented below in connection with the accompanying drawing, in which.

DETAILED DESCRIPTION

Figure 1:
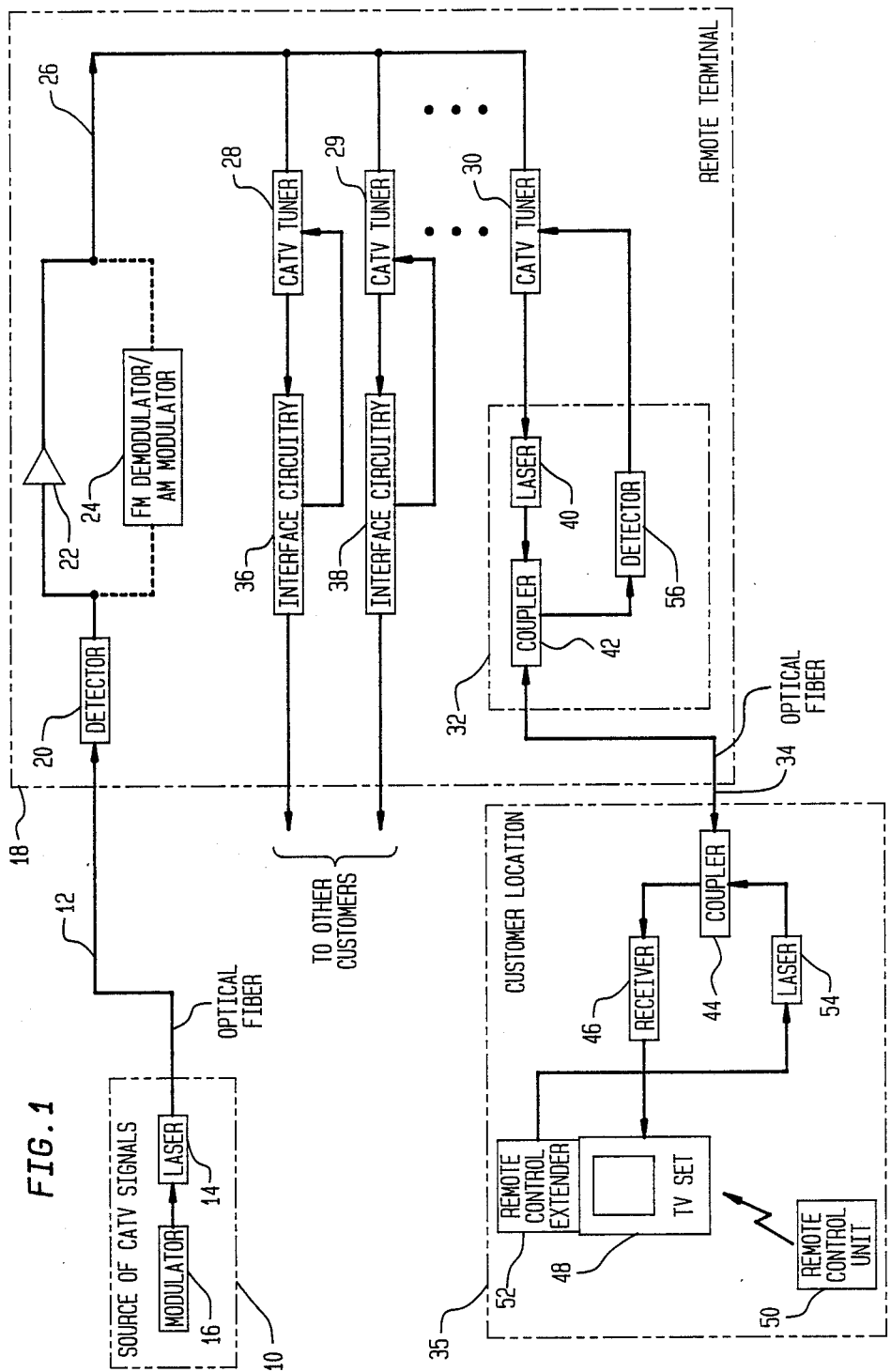
FIG. 1 schematically depicts a specific illustrative CATV signal distribution system made in accordance with the principles of the present invention.

The FIG. 1 system includes a conventional source 10 that supplies multiple-channel CATV signals to an optical fiber 12 which, advantageously, is of the single-mode type. The source 10 includes a laser 14 whose optical carrier output is varied in standard ways in accordance with signals applied to the laser from a modulator 16. By way of example, the electrical output of the modulator 16 is representative of the information contained in, for example, about 30-to-50 CATV channels.

Illustratively, the source 10 of FIG. 1 comprises a distribution facility of a CATV company. Signals are supplied to such a facility in various ways, for example from satellites, and then applied to the fiber or supertrunk 12 on either a real-time or delayed basis. Alternatively, the source 10 of CATV signals comprises the central office of a telephone company.

In practice, the length of the fiber 12 between the source 10 (FIG. 1) and a remote terminal (RT) 18 can be as long as about 30 kilometers. Or, if desired, plural shorter fibers (not shown) can be utilized to distribute signals from the source 10 to plural respective RTs.

In standard ways known in the art, the optical carrier signal transmitted from the source 10 of FIG. 1 to the RT 18 is modulated in accordance with either a conventional frequency-modulated (FM) or amplitude-modulated (AM) format. In either case, by utilizing commercially available components such as a low-noise wide-bandwidth laser 14 in the source 10 and a low-noise wide-bandwidth optical detector 20 in the RT 18, multiple-channel CATV signals of broadcast quality are delivered to the RT.

The current cost of the laser 14 and of the detector 20 shown in FIG. 1 is relatively high. But, as noted earlier above, their cost in the overall distribution system is in effect shared among multiple customers who are connected to each RT. In practice, about 500-to-1000, or more, customers are so connected. (Also, in some cases plural RTs are served by a single such laser.) Thus, the cost-per-customer of these shared expensive components is relatively low and economically feasible.

The specific illustrative RT 18 of FIG. 1 includes two parallel paths connected to the output of the detector 20. In practice, one or the other of these paths is used, depending respectively on whether the detected signal had been modulated in an AM or FM format. For AM-modulated signals, only the upper path including amplifier 22 is utilized. For FM-modulated signals, only the lower dash-line path including box 24 is employed. The box 24, which comprises multiple standard FM-to-AM converters, demodulates the FM-mode signals and transforms them into an AM format. Thus, in either case, the signals appearing on line 26 in the RT 18 comprise conventional multiple-channel AM-modulated CATV signals.

In turn, the multiple-channel AM-modulated CATV signals on the line 26 of the RT 18 of FIG. 1 are applied in parallel to each of multiple CATV tuners. Illustratively, these tuners are standard commercially available units of the AM-type. Only three such tuners, designated 28, 29 and 30, respectively, are explicitly shown in FIG. 1. The total number of such tuners in the RT 18 corresponds to the total number of customer TV sets served by the RT. Each tuner is respectively associated with a different customer TV set. The connection between each tuner and its associated customer is made through interface circuitry shown in FIG. 1 and described below.

The conventional AM tuners included in the RT 18 of FIG. 1 are of the type usually located on customer premises. Of the multiple channels applied to such a tuner, one channel is selected to appear at the output thereof by applying to the tuner a control signal representative of the selected channel, as is well known in the art.

A practical advantage stemming from the fact that all the tuners of the FIG. 1 system are located in the RT 18 is that the tuners are thereby under the sole control of the operator of the CATV system. Unauthorized tampering of the tuners by customers is thereby prevented. Further, adjustments to the tuners and adding new features to them are thereby facilitated.

In FIG. 1, interface circuitry 32 in the RT 18 is interposed between the AM tuner 30 and single-mode optical fiber 34. In turn, the fiber 34 is dedicated to interconnecting the RT 18 with a single nearby customer location 35. Similarly, the other tuners 28 and 29 shown in FIG. 1 are also connected to respective dedicated customer fibers via interface circuitry 36 and 38, respectively, each of which is identical to the circuitry 32.

The interface circuitry 32 of FIG. 1 includes a laser 40 whose carrier output is modulated in accordance with the single-channel electrical output of the associated tuner 30. In turn, the modulated output of the laser 40 is applied to the fiber 34 for transmission to the customer location 35 via a standard optical coupler 42. (Alternatively, a conventional wavelength-division-multiplexer unit may be substituted for the coupler 42, as well as for each of the other couplers shown in the drawing.) Illustratively, the length of the fiber 34 is, for example, about five kilometers or less.

In the customer location 35 (FIG. 1), the single-channel optical signals transmitted over the fiber 34 are routed by another standard optical coupler 44 to an optical receiver 46 (a detector/amplifier). In turn, the AM-modulated electrical-signal output of the receiver 46 is applied to a conventional TV set 48.

By way of example, the electrical signal output of the tuner 30 of FIG. 1 comprises a carrier frequency corresponding to the frequency of channel 3 (54–60 megahertz). This frequency is AM-modulated in accordance with the selected single-channel output of the tuner 30. In turn, this AM-modulated electrical signal is utilized to directly drive the laser 40, which, for example, is designed to emit a carrier frequency whose wavelength is 1300 nanometers. In practice, the bandwidth that has to be provided by the laser 40 is thus, for example, less than 100 megahertz. (By contrast, if the laser 40 were driven by a standard multiple-channel CATV signal, the bandwidth of that signal would be about ≧ 300 megahertz. Also, in that case, a driver circuit for the associated laser would typically be required.)

As indicated, the laser 40 shown in FIG. 1 is only required to operate over a narrow bandwidth. For this reason, each of the multiple lasers included in the RT of the depicted system can be a commercially available device that is relatively inexpensive.

Similarly, in accordance with this invention, the receivers included in customer locations (such as the receiver 46 shown in FIG. 1) are also therefore only required to be relatively narrow-bandwidth units. Accordingly, they too can be commercially available units that are inexpensive relative to units required for operation in a multiple-channel or wide-bandwidth application.

In accordance with this invention, signals are sent from each customer location to the RT 18 (FIG. 1) to select a single channel for viewing. Thus, for example, a standard remote control unit 50 can be utilized by the customer to select a channel. Ultraviolet signals from the unit 50 selectively activate a conventional remote control extender 52 (a receiver/amplifier) which in turn drives a laser 54 to emit a signal representative of the selected channel. In turn, the selection signal provided by the laser 54 is applied via the optical coupler 44 to the fiber 34. In the RT 18, the selection signal is routed by the optical coupler 42 to an optical detector 56. The electrical signal generated by the detector 56 is then applied to the tuner 30 to cause its output to provide an AM-modulated signal representative of the single channel selected by the viewer.

Illustratively, the laser 54 and its associated detector 56 are designed to operate at a carrier frequency whose wavelength is about 800 nanometers. In practice, the bandwidth and power requirements imposed on these devices are not critical and are easily met. Hence, relatively inexpensive commercially available lasers and detectors suffice for carrying out the above-described channel selection process.

As noted above, other types of signals can also be distributed to customers over a CATV system of the type shown in FIG. 1. A specific illustrative modification of FIG. 1, adapted to distribute both CATV and conventional telephone signals to multiple customers, is depicted in FIG. 2.

Figure 2:
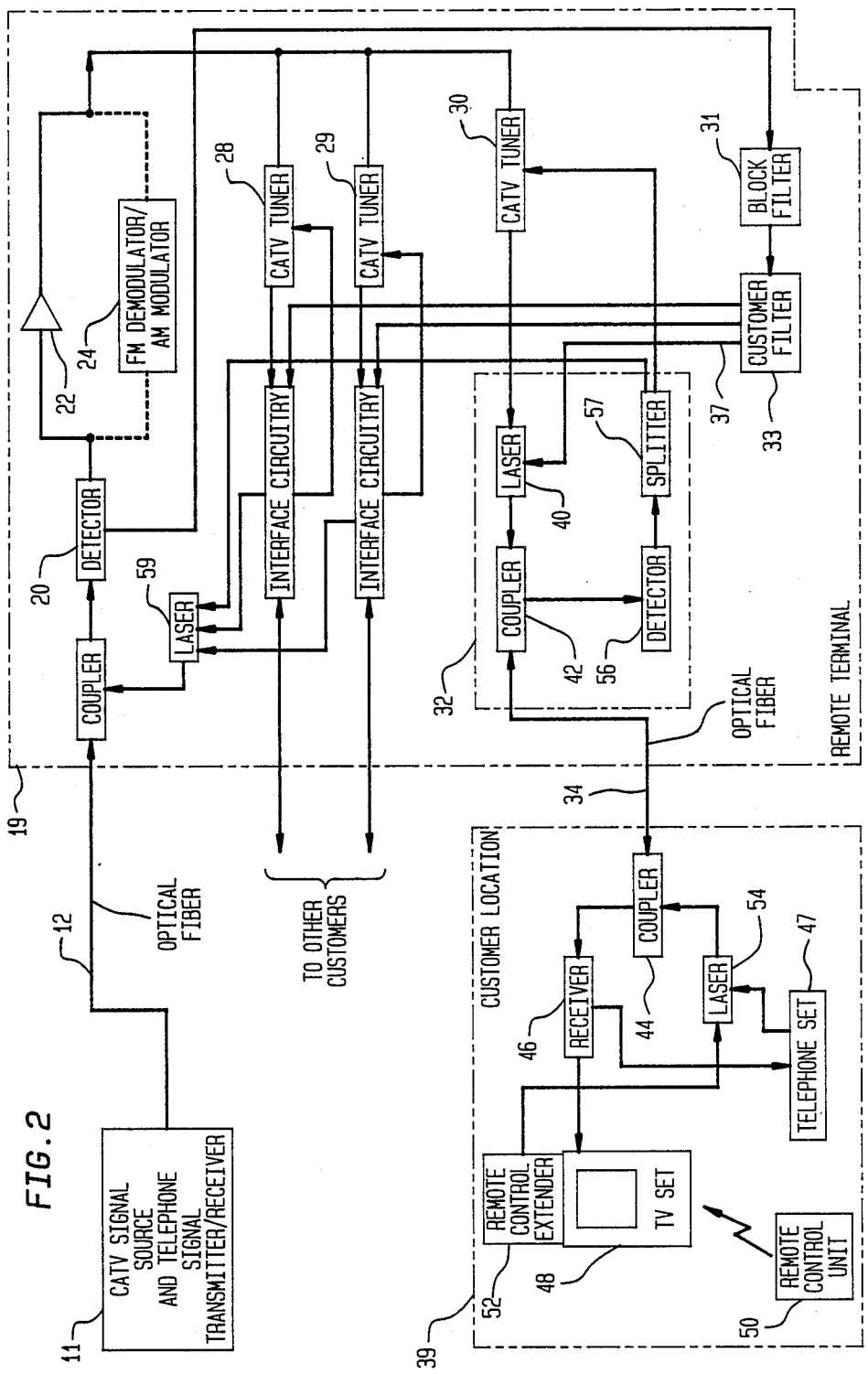
FIG. 2 shows a particular modified version of the FIG. 1 system adapted to distribute both CATV and telephone signals to multiple customers.

Illustratively, many of the components included in the FIG. 2 system can be identical to those shown in FIG. 1 and described above. These identical components are designated in FIG. 2 with the same respective reference numerals used in FIG. 1.

Unit 11 in FIG. 2 provides CATV signals of the same type supplied by the source 10 of FIG. 1. In addition, the unit 11 also includes standard equipment, such as that found at the central office of a telephone company, for transmitting and receiving conventional telephone signals. In known ways, both types of signals are utilized to modulate an optical carrier applied to fiber 12 for delivery to a distant RT 19.

In the RT 19 of FIG. 2, the multiple-channel CATV signals received from the unit 11 are processed in the same manner described above in connection with FIG. 1. Thus, attention below will only be directed to the portion of the RT 19 that processes received telephone signals.

One output of the detector 20 in the RT 19 (FIG. 2) is applied to a standard block filter 31. By design, the filter 31 provides at its output only signals representative of the block of telephone signals to be transmitted to the multiple customers served by the RT 19.

In turn, the output of the block filter 31 of FIG. 2 is applied to a conventional filter 33 which distributes signals from the aforementioned block of telephone signals to output leads that are respectively associated with the multiple customers connected to the RT 19. Thus, for example, output lead 37 emanating from the filter 33 carries telephone signals destined only for customer location 39 shown in FIG. 2. Illustratively, these signals comprise a modulated 100 megahertz carrier. (The telephone carrier frequency is selected to avoid interference with the television channels arising from nonlinearity of the laser 40.)

The telephone signals applied to the lead 37 of FIG. 2 modulate the output of the same laser 40 that is utilized to apply CATV signals to the optical fiber 34. CATV and telephone signals can thus be transmitted simultaneously, or at respectively different times, to the customer location 39.

At the customer location, incoming signals are applied by the receiver 46 to telephone set 47. Only the modulated telephone-signal portion of the detected incoming signals is effective to cause the set 47 to provide output signals.

Outgoing telephone signals from the set 47 of FIG. 2 are applied to the same laser 54 that is utilized to send channel-selection signals to the RT 19. By way of example, these outgoing telephone signals from the set 47 comprise a modulated 32 kilohertz carrier.

In the RT 19, outgoing telephone signals are applied by the detector 56 to a standard splitter 57 which routes the telephone signals to a laser 59. In turn, the carrier output of the laser 59 is modulated in accordance with the telephone signals applied thereto. The modulated optical signals provided by the laser 59 are then applied to the fiber 12 for transmission to the telephone receiver contained in the unit 11. Illustratively, the laser 59 is designed to provide a carrier output frequency whose wavelength is 1550 nanometers. (Or, instead of using couplers and different wavelength sources for the up-/down-stream signals along the fiber 12, one can use two fibers with respective sources each at 1300 nanometers.)

The herein-described CATV signal distribution system is easily adapted to serve a customer location that contains more than one TV set equipped for CATV reception. A portion of a specific illustrative such adaptation of the FIG. 1 system is schematically represented in FIG. 3.

Figure 3:
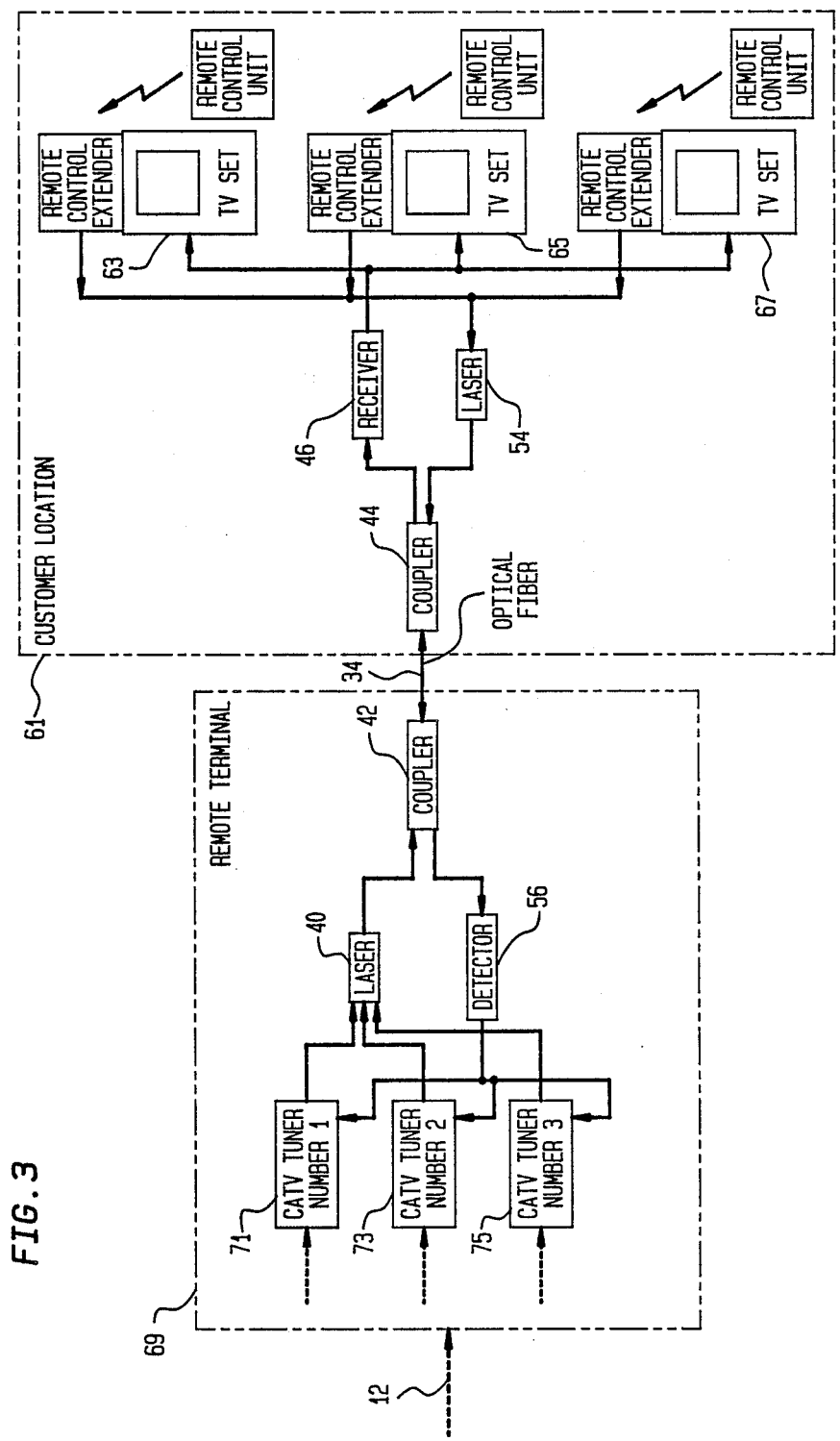
FIG. 3 illustrates one manner in which the inventive system can be arranged to serve more than one TV set at a customer location.

Assume, for example, that customer location 61 shown in FIG. 3 includes three TV sets 63, 65 and 67 each equipped for CATV reception. Illustratively, each such set thus has associated therewith a conventional remote control unit and remote control extender of the type described above in connection with FIG. 1.

In one embodiment of the invention, the remote control unit and remote control extender respectively associated with each of the TV sets 63, 65 and 67 of FIG. 3 are designed to operate at different non-interfering frequencies. (Otherwise, channel selection for one set might affect the channel setting of another nearby set.) In practice, this is easily typically achieved by, for example, simply providing pairs of commercially available remote control units and tuners made by different manufacturers. In one such illustrative system, pairs of units and tuners made by Tandy, Toshiba and Scientific Atlanta, respectively, were determined to provide non-interfering channel-selection signals.

Alternatively, non-interfering channel-selection signals can be provided in the depicted system by designing the selection signals emanating from the remote control unit and extenders to be at different carrier frequencies. In that case, each tuner in the RT 69 would have a filter connected thereto for passing to the tuner only its respective selection signal.

In FIG. 3, the RT 69 includes as many tuners as there are TV sets in the multiple customer locations served by the CATV distribution system. Only three such tuners 71 73 and 75 are explicitly shown in the RT 69. These tuners 71, 73 and 75 are respectively associated with and responsive only to selection signals sent thereto from the TV sets 63, 65 and 67.

Each of the tuners 71, 73 and 75 of FIG. 3 is designed to provide at its output a different carrier frequency modulated by the signals of a single selected channel. Thus, for example, the carriers provided at the outputs of the tuners 71, 73 and 75 may correspond to channels 2, 3 and 4, respectively. In that case, the TV sets 63, 65 and 67 in the customer location 61 would be respectively tuned to receive channels 2, 3 and 4.

In a system of the type represented in FIG. 3, as many as three CATV channels at a time may be transmitted over the fiber 34 between the RT 69 and the customer location 61. Even in such a case, however, it has been found in practice that the relatively low-cost laser 40 and the relatively low-cost receiver 46 are satisfactory to provide good-quality TV reception.

Finally, it is to be understood that the above-described arrangements are only illustrative of the principles of the present invention. In accordance with these principles, numerous modifications and alternatives may be devised by those skilled in the art without departing from the spirit and scope of the invention. Thus, for example, the tuners included in the RT may be FM-type rather than AM-type units. In that case, an FM-to-AM converter must be provided for each TV set served by the system.

What is claimed is:

1. A CATV signal distribution system comprising
a first optical fiber,
source means for applying multiple-channel CATV signals to one end of said fiber,
a remote terminal connected to the other end of said first fiber, said terminal being adapted to serve multiple customer locations each of which includes at least one TV set equipped for CATV reception,
multiple second optical fibers each connected between said remote terminal and a respective one of said customer locations for carrying single-channel CATV signals from the remote terminal to each TV set at a customer location and for carrying channel-selection signals from each TV set in a customer location to said remote terminal, means associated with each TV set in a customer location for applying channel-selection signals to the fiber connected to said location, and means, including multiple tuners in said remote terminal each responsive to the multiple-channel CATV signals applied to said remote terminal via said first fiber and each respectively responsive to the channel-selection signals from a different TV set in a customer location, for applying selected single-channel CATV signals to the second fibers that are respectively connected to said customer locations, wherein said means for applying selected single-channel CATV signals to said second fibers includes lasers in said remote terminal respectively responsive to said tuners for applying to said second fibers modulated signals at a first CATV carrier frequency, and wherein said means in a customer location for applying channel-selection signals to the one of said second fibers connected to said customer location also includes a laser, said customer location lasers being adapted to provide modulated channel-selection signals at a second carrier frequency that is different from said first carrier frequency, further including means for carrying telephone signals to and from said multiple customer locations via said first and second fibers and said remote terminal, wherein said carrying means includes the lasers in said remote terminal, which lasers are modulated to carry telephone signals at a first telephone carrier frequency from said terminal to customer locations, wherein said carrying means further includes the lasers in customer locations, which lasers are modulated to carry telephone signals at a second telephone carrier frequency from said locations to said remote terminal, and wherein said first telephone carrier frequency is sufficiently different from said first CATV carrier frequency to avoid beat frequencies, arising from nonlinearities in the lasers in said remote terminal, that fall within the frequency spectrum of CATV signals delivered to a TV set at a customer location.

2. A system as in claim 1 wherein said first telephone carrier frequency is sufficiently greater than said first CATV carrier frequency to avoid beat frequencies, arising from nonlinearities in the laser in said remote terminal, that fall within the frequency spectrum of CATV signals or of telephone signals delivered to a customer location.

* * * * *